Oct. 26, 1954   J. R. HOLLINS   2,692,981
VEHICLE SIGNALING SWITCH ARRANGEMENT
Filed July 24, 1951   2 Sheets-Sheet 1

INVENTOR.
JESSE R. HOLLINS
BY
ATTORNEY

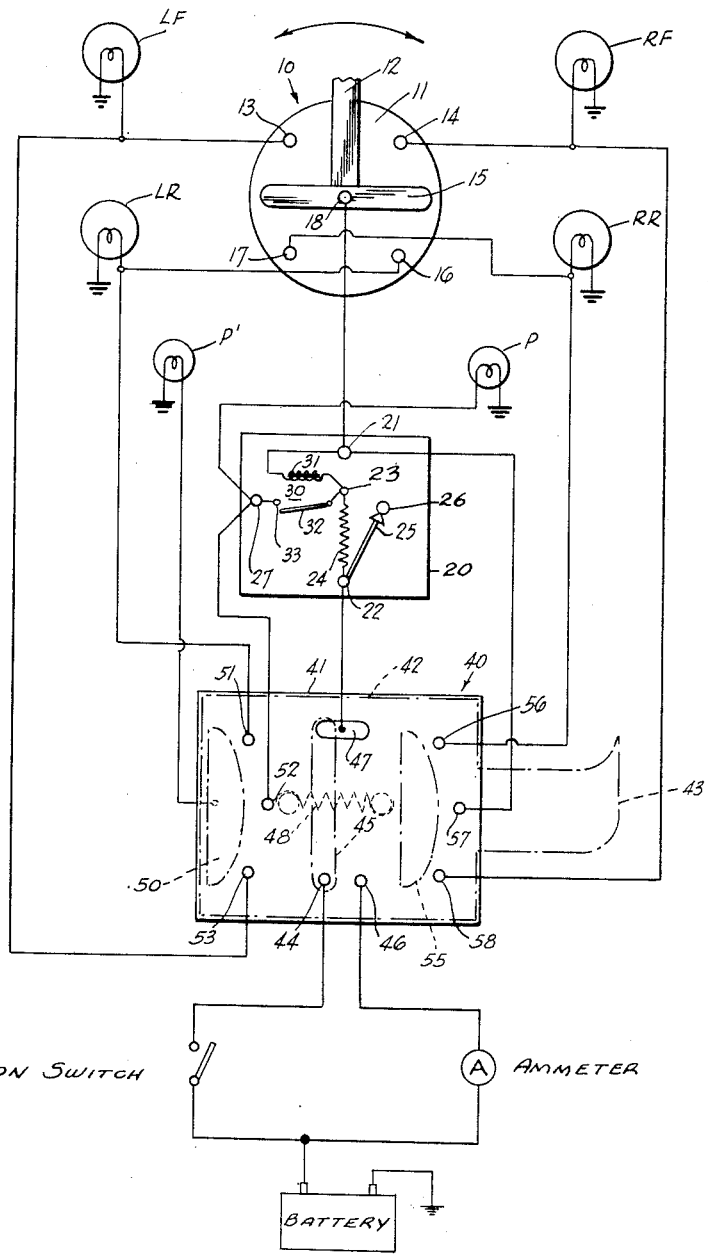

Patented Oct. 26, 1954

2,692,981

UNITED STATES PATENT OFFICE 2,692,981

VEHICLE SIGNALING SWITCH ARRANGEMENT

Jesse R. Hollins, Brooklyn, N. Y.

Application July 24, 1951, Serial No. 238,263

8 Claims. (Cl. 340—81)

This invention relates to directional signalling lamp circuits for vehicles and, more particularly, to a novel switch and circuit connection whereby all the signal lamps may be flashingly energized at once to act as "flares" for energizing stopping or parking.

Modern motor vehicles are equipped with two pairs of lamps for signalling changes in direction, one pair being mounted on either side of the front of the vehicle and the other pair on either side of the rear of the vehicle. A selector switch is provided to selectively energize both left lamps or both right lamps, preferably in circuit with a flasher to "flash" the selectively illuminated lamps.

The flasher generally includes a resistance wire which is always in circuit and which is periodically shunted by operation of a movable switch arm responsive to heating of the resistance wire. This arm makes alternate contact with two terminals. When the resistance wire is not shunted, its high resistance prevents any effective current flow to the signal lamps, so that the lamps are energized only when the resistance wire is shunted by the movable flasher arm. When the latter shunts the resistance wire, the wire cools and the flasher arm disengages the shunting contact.

When the flasher arm disengages the shunt contact, it is engaged with a terminal or contact which, for convenience, will be termed the "dead" contact to distinguish from the "shunt" contact and the "live" contact connected to the vehicle battery or generator.

The flasher also includes a pilot lamp relay having an operating coil in series with the shunt contact and the flasher terminal connected to the selector switch. The relay has an armature arranged, when the relay is energized, to connect the shunt contact to a pilot lamp terminal of the flasher.

When a vehicle makes an emergency stop, or is parked along a highway because of being disabled, it is desirable to warn other vehicles, to avoid risk of accident. While flares are frequently used for this purpose, they are not usually available in private passenger cars. Further, though the signal lamps on one or the other side of the vehicle could be flashed as a warning, the lamp controls are usually connected through the ignition switch, so that in an emergency parking situation, when the motor is generally turned off, the signal lamps cannot be energized.

The present invention is directed to a novel "flare" switch connected between the flasher and the source of electric potential therefor. This "flare" switch normally connects the flasher to the ignition switch or lock, but can be operated to connect the flasher to the vehicle ammeter which is always connected to the battery and generator. Additionally, the flare switch connects the "shunt" terminal of the flasher to one set of signal lamps independently of the selector switch, and connects the pilot lamp terminal of the flasher to the other set of lamps, likewise independently of the selector switch. The flare switch also connects a second pilot lamp to the relay or pilot lamp flasher terminal.

When the flare switch is operated, the ignition switch and selector switch are bypassed. One set of lamps is flashingly energized through the "shunt" flasher terminal, and the other set and the second pilot lamp, through the flasher relay terminal. Both sets of lamps are thus simultaneously flashed. Also, the lamp load is divided between the shunt terminal and the relay terminal so that the shunt contact and relay coil are not overloaded or overheated. For an understanding of the invention principles, reference is made to the following description of a typical embodiment thereof as illustrated in the accompanying drawing.

In the drawing:

Fig. 2 is a schematic wiring diagram of the arrangement of Fig. 1 as altered in accordance with the present invention.

Figure 1:
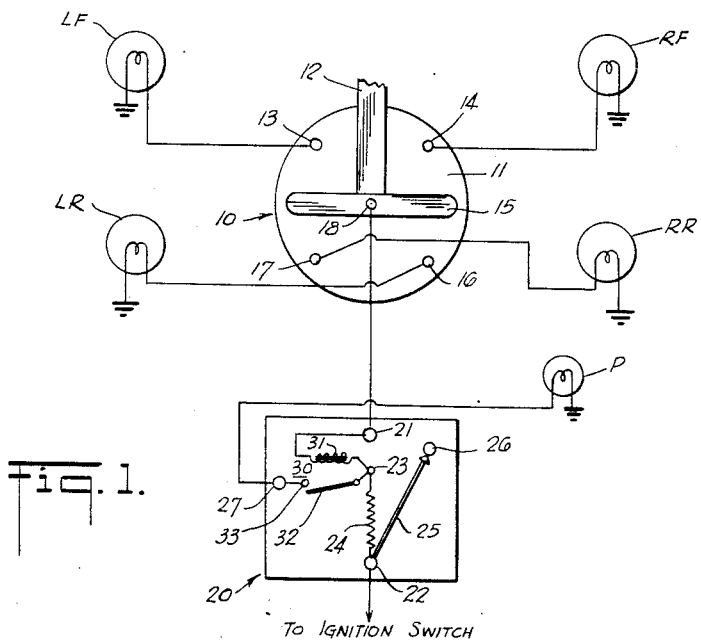
Fig. 1 is a schematic wiring diagram of a standard flasher and vehicle directional signalling arrangement.

Referring to Fig. 1, the usual vehicle directional signalling circuit includes a selector switch 10 having a base 11 and an operating handle 12 pivoted thereon. Base 11 carries contacts 13, 14, 16, 17 cooperable with contact strip or switch 15 movable with handle 12. Contacts 13 and 14 are respectively connected to grounded left front signal lamp LF and grounded right front signal lamp RF. Similarly, contacts 16, 17 are respectively connected to grounded left rear signal lamp LR and grounded right rear signal lamp RR. Central contact 18 is connected to the shunt terminal 21 of a flasher 20.

Flasher 20 has a live terminal 22 normally connected to the vehicle ignition switch. Terminal 22 is connected to shunt contact 23 by a high resistance wire 24 of "Nichrome" or the like, and is also connected to a movable operating arm 25 normally engaged with "dead" contact 26. Shunt contact 23 is connected to shunt terminal 21 through the operating coil 31 of a relay 30 having an armature 32 connected to contact 23. Armature 32 is arranged to engage a front contact 33 when coil 31 is energized, and contact 33 is connected to relay terminal 27 of the flasher. A grounded low resistance pilot lamp P is connected to terminal 27.

This conventional arrangement operates in the following manner. Assuming that a left turn is to be signalled, selector switch arm 12 is moved clockwise so that strip 15 connects contacts 13 and 16 to contact 18. Current flows through wire 24, whose resistance is sufficiently high to prevent enough flow of current to energize lamps LF and LR or relay 30. As wire 24 is heated, it swings arm 25 to engage shunt contact 23, shunting resistance wire 24 and permitting full current flow to lamps LF and LR through relay coil 31. Relay coil 31 picks up armature 32 to engage contact 33 and energize pilot lamp P. As shunted wire 24 cools, it contracts, swinging arm 25 to disengage contact 23 so that the relay and lamps are deenergized. The cycle then repeats to flash lamps LF, LR and P. Thus, either the right or left signal lamps may be selectively flashed, pilot lamp P being flashed with either pair.

Figure 3:
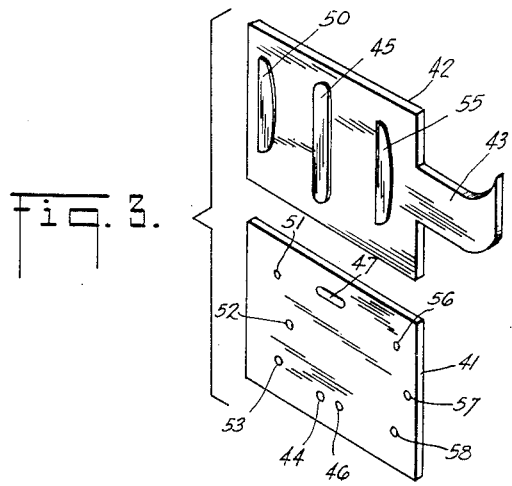
Fig. 3 is a perspective view of the principal elements of the flare switch.

Referring to Figs. 2 and 3, a flare switch 40 is connected between flasher live terminal 22 and the vehicle potential source. Switch 40 includes a dielectric base 41 on which is movably mounted a dielectric slide 42, which may be spring biased (not shown) to the position of Fig. 2. Slide 42 has an operating handle 43.

Base 41 carries near one side a pair of spaced contacts 44, 46 transversely opposite an elongated contact 47 on the opposite side of the base. Contact 47 is connected to flasher contact 22, contact 44 is connected to the ignition switch, and contact 46 is connected to the vehicle ammeter, the ignition switch or lock and the ammeter being connected to the grounded vehicle battery in the usual manner.

To the left of these intermediate contacts, as viewed in Figs. 2 and 3, base 41 has a first set of three contacts 51, 52, 53, arranged along an arc, although these contacts could be in a straight line. Contact 51 is connected to signal lamp LR, contact 52 to flasher relay contact 27, and contact 53 to lamp LF.

A second set of contacts 56, 57, 58 are on base 41 to the right of the intermediate contacts and are arranged similarly to the first set. Contact 56 is connected to lamp RR, contact 57 to flasher terminal 21, and contact 58 to lamp RF.

The underside of slide 42 carries three transversely arranged conductive contact strips 45, 50 and 55. Strip 50 is positioned to selectively interconnect contacts 51, 52, 53. Strip 45 is positioned to selectively connect contact 47 to either contact 44 or contact 46. Strip 55 is arranged to selectively interconnect contacts 56, 57, 58. A second grounded pilot lamp P' is connected to strip 50.

Normally slide 42 is biased to the left by spring 48 so that strip 45 connects contacts 44 and 47, thus connecting flasher 20 to the ignition switch. In this position the signal lamps are under the control of selector switch 10, strips 50 and 55 being disengaged from their respective contacts.

To flash all the signal lamps simultaneously, handle 43 is grasped to pull slide 42 to the right. Strip 45 now connects flasher 20 to the ammeter through contacts 46 and 47. Strip 50 interconnects contacts 51, 52 and 53, energizing lamps LF and LR from flasher relay contact 27. Pilot lamps P and P' are also energized from contact 27. Strip 55 interconnects contacts 56, 57, 58, energizing lamps RF and RR from shunt terminal 23.

All the lamps are thus flashingly energized simultaneously, lamps LF, LR, P and P' drawing current through relay terminal 27 and lamps RF, RR drawing current through shunt terminal 21 and relay coil 31. Thus, neither the shunt terminal nor the relay coil is overloaded.

In the event selector switch 10 has only one "left" terminal and one "right" terminal, both the front and rear lamps being connected to one terminal, then one contact (51, 53 or 56, 58) can be omitted from base 41.

While a specific embodiment of the invention has been shown and described to illustrate the application of the invention principles, it will be understood that the invention may be embodied otherwise without departing from such principles.

What is claimed is:

1. A signalling system for a vehicle having an ignition lock, an ammeter, a grounded battery connected to said ignition lock and said ammeter, sets of grounded signal lamps, a flasher having a shunt terminal, a shunt contact connected to said shunt terminal, a live terminal, a high resistance wire interconnecting said live terminal and said shunt contact, a movable contact arm connected to said live terminal and operable by said wire alternately to engage and disengage said shunt contact, and a selector switch having plural lamp contacts respectively connected to the sets of lamps and a switch arm connected to the shunt terminal of the flasher and selectively engageable with the lamp contacts to selectively connect either set of lamps to the shunt terminal of the flasher, said system comprising a control switch including a base having a flasher contact connected to the live terminal of the flasher, a pair of live contacts respectively connected to the ignition lock and the ammeter, and first and second pairs of lamp contacts, one lamp contact of one pair being connected directly to the shunt terminal and one lamp contact of the other pair being connected to said shunt contact when said contact arm is engaged with the latter, means connecting the other lamp contact of each pair to a different one of the lamp contacts of the selector switch, a first bridging element operable to interconnect the lamp contacts of the first pair, a second bridging element operable to interconnect the lamp contacts of the second pair, a third bridging element selectively operable to connect the flasher contact of the switch to either of said pair of live contacts, said bridging elements normally being in a position in which said first and second elements are disengaged from their associated lamp contacts and said third element connects said flasher contact to the ignition lock live contact, and means operable to simultaneously move said bridging elements to positions bridging each pair of lamp contacts and connecting said flasher contact to the ammeter live contact to flash all the signal lamps simultaneously.

2. A signalling system for a vehicle having an ignition lock, an ammeter, a grounded battery connected to said ignition lock and said ammeter, sets of grounded signal lamps, a flasher having a shunt terminal, a relay terminal, a shunt contact connected to said shunt terminal, a relay having a coil connected between said shunt terminal and shunt contact and an armature connected to said shunt contact and operable by said coil to engage the relay terminal, a live terminal, a high resistance wire interconnecting said live terminal and said shunt contact, a movable contact arm connected to said live terminal and operable by said wire alternately to engage and disengage said shunt contact, and a selector switch having plural lamp contacts respectively connected to the sets of lamps and a switch arm connected to the shunt terminal of the flasher and selectively engageable with the lamp contacts to selectively connect either set of lamps to the shunt terminal of the flasher, and a pilot lamp connected to said relay terminal, said system comprising a control switch including a base having a flasher contact connected to the live terminal of the flasher, a pair of live contacts respectively connected to the ignition lock and the ammeter, and first and second pairs of lamp contacts, one lamp contact of each pair being connected directly to a different one of the lamp contacts of the selector switch and the other lamp contact of each pair being connected respectively to the shunt terminal and the relay terminal of the flasher, a first bridging element operable to interconnect the lamp contacts of the first pair, a second bridging element operable to interconnect the lamp contacts of the second pair, a third bridging element selectively operable to connect the flasher contact of the switch to either of said pair of live contacts, means biasing said bridging elements to a position in which said first and second elements are disengaged from their associated lamp contacts and said third element connects said flasher contact to the ignition lock live contact, and means operable to simultaneously move said bridging elements to positions bridging each pair of lamp contacts and connecting said flasher contact to the ammeter live contact to flash all the signal lamps simultaneously.

3. A signalling system for a vehicle having an ignition lock, an ammeter, a grounded battery connected to said ignition lock and said ammeter, sets of grounded signal lamps, a flasher having a shunt terminal, a shunt contact connected to said shunt terminal; a live terminal, a high resistance wire interconnecting said live terminal and said shunt contact, and movable contact arm connected to said live terminal and operable by said wire alternately to engage and disengage said shunt contact, and a selector switch having plural lamp contacts respectively connected to the sets of lamps and a switch arm connected to the shunt terminal of the flasher and selectively engageable with the lamp contacts to selectively connect either set of lamps to the shunt terminal of the flasher, said system comprising a control switch including a base having a flasher contact connected to the live terminal of the flasher, a pair of live contacts respectively connected to the ignition lock and the ammeter, and first and second pairs of lamp contacts, one lamp contact of each pair being connected directly to a different one of the lamp contacts of the selector switch and the other lamp contact of one pair being connected to the shunt terminal of the flasher and one lamp contact of the other pair being connected to said shunt contact when said contact arm is engaged with the latter, a slide movably mounted on said base and carrying a first bridging element operable to interconnect the lamp contacts of the first pair, a second bridging element operable to interconnect the lamp contacts of the second pair, and a third bridging element selectively operable to connect the flasher contact of the switch to either of said pair of live contacts, and said slide normally having a position in which said first and second elements are disengaged from their associated lamp contacts and said third element connects said flasher contact to the ignition lock live contact, said slide being operable to a position in which said first and second elements bridge the respective pairs of lamp contacts and said third element connects said flasher contact to the ammeter live contact, to shunt the selector switch and flash all the signal lamps simultaneously.

4. A signalling system for a vehicle having an ignition lock, an ammeter, a grounded battery connected to said ignition lock and said ammeter, sets of grounded signal lamps, a flasher having a shunt terminal, a shunt contact connected to said shunt terminal, a live terminal, a high resistance wire interconnecting said live terminal and said shunt contact, a movable contact arm connected to said live terminal and operable by said wire alternately to engage and disengage said shunt contact, and a selector switch having plural lamp contacts respectively connected to the sets of lamps and a switch arm connected to the shunt terminal of the flasher and selectively engageable with the lamp contacts to selectively connect either set of lamps to the shunt terminal of the flasher, said system comprising a control switch including a base having an elongated flasher contact connected to the live terminal of the flasher, a pair of spaced live contacts respectively connected to the ignition lock and the ammeter opposite said elongated flasher contact, and first and second pairs of lamp contacts, one lamp contact of each pair being connected directly to a different one of the lamp contacts of the selector switch and the other lamp contact of one pair being connected to the shunt terminal of the flasher and one lamp contact of the other pair being connected to said shunt contact when said contact arm is engaged with the latter, a slide movably mounted on said base and carrying a first bridging element operable to interconnect the lamp contacts of the first pair, a second bridging element operable to interconnect the lamp contacts of the second pair, and a third bridging element selectively operable to connect the flasher contact of the switch to either of said pair of live contacts, and means biasing said slide to a position in which said first and second elements are disengaged from their associated lamp contacts and said third element connects said flasher contact to the ignition lock live contact, said slide being operable to a position in which said first and second elements bridge the respective pairs of lamp contacts and said third element connects said flasher contact to the ammeter live contact, to shunt the selector switch and flash all the signal lamps simultaneously.

5. A signalling system for a vehicle having an ignition lock, an ammeter, a grounded battery connected to said ignition lock and said ammeter, sets of grounded signal lamps, a flasher having a shunt terminal, a relay terminal, a shunt contact connected to said shunt terminal, a relay having a coil connected between said shunt terminal and said shunt contact and an armature connected to said shunt contact and operable by said coil to engage the relay terminal, a live terminal, a high resistance wire interconnecting said live terminal and said shunt contact, and movable contact arm connected to said live terminal and operable by said wire alternately to engage and disengage said shunt contact, and a selector switch having plural lamp contacts respectively connected to the sets of lamps and a switch arm connected to the shunt terminal of the flasher and selectively engageable with the lamp contacts to selectively connect either set of lamps to the shunt terminal of the flasher, said system comprising a control switch including a base having a flasher contact connected to the live terminal of the flasher, a pair of live contacts respectively connected to the ignition lock and the ammeter, and first and second pairs of lamp contacts, one lamp contact of each pair being connected directly to a different set of signal lamps and the other lamp contacts being connected respectively to the shunt terminal and the relay terminal of the flasher, a slide movably mounted on said base and carrying a first bridging element operable to interconnect the lamp contacts of the first pair, a second bridging element operable to interconnect the lamp contacts of the second pair, and a third bridging element selectively operable to connect the flasher contact of the switch to either of said pair of live contacts, a first pilot lamp connected to the flasher relay terminal, a second pilot lamp connected to one of said first and second elements, and means biasing said slide to a position in which said first and second elements are disengaged from their associated lamp contacts and said third element connects said flasher contact to the ignition lock live contact, said slide being operable to a position in which said first and second elements bridge the respective pairs of lamp contacts and said third element connects said flasher contact to the ammeter live contact to shunt the selector switch and flash all the signal lamps and both pilot lamps simultaneously.

6. In a signalling system for a vehicle having an ignition lock, an ammeter, a grounded battery connected to said ignition lock and said ammeter, and two sets of grounded direction signalling lamp means; a flasher having a live terminal, a shunt terminal; a selector switch connected to said shunt terminal, a shunt contact connected to said shunt terminal, a high resistance wire interconnecting said live terminal and said shunt contact, and a movable contact arm connected to said live terminal and operable by said wire alternately to engage and disengage said shunt contact and to each of the lamp means and selectively operable to connect either set of lamp means to said shunt terminal; and switch means connected to said live terminal, the ignition lock, and the ammeter and selectively operable to connect said live terminal to either the ignition lock or the ammeter; said switch means including connections to each of the lamp means in parallel with the selector switch connections thereto and, in the position connecting said flasher to the ammeter, connecting the lamp means to said flasher independently of said selector switch.

7. In a signalling system for a vehicle having an ignition lock, an ammeter, a grounded battery connected to said ignition lock and said ammeter, and two sets of grounded direction signalling lamp means; a flasher having a live terminal, a shunt terminal, a relay terminal, a shunt contact connected to said shunt terminal, a relay having a coil connected between said shunt terminal and shunt contact and an armature connected to said shunt contact and operable by said coil to engage the relay terminal, a high resistance wire interconnecting said live terminal and said shunt contact, and a movable contact arm connected to said live terminal and operable by said wire alternately to engage and disengage said shunt contact; a selector switch connected to said shunt terminal and to each of the lamp means and selectively operable to connect either set of lamp means to said shunt terminal; and switch means connected to said live terminal, the ignition lock, and the ammeter and selectively operable to connect said live terminal to either the ignition lock or the ammeter; said switch means including connections to each of the lamp means, to the shunt terminal, and to the relay terminal and, in the position connecting said flasher to the ammeter, connecting one set of lamp means to the shunt terminal and the other set of lamp means to the relay terminal.

8. In a signalling system for a vehicle having an ignition lock, an ammeter, a grounded battery connected to said ignition lock and said ammeter, and two sets of grounded direction signalling lamp means; a flasher having a live terminal, a shunt terminal, a relay terminal, a shunt contact connected to said shunt terminal, a relay having a coil connected between said shunt terminal and shunt contact and an armature connected to said shunt contact and operable by said coil to engage the relay terminal, a high resistance wire interconnecting said live terminal and said shunt contact, and a movable contact arm connected to said live terminal and operable by said wire alternately to engage and disengage said shunt contact; and switch means connected to said live terminal, the ignition lock, and the ammeter and selectively operable to connect said live terminal to either the ignition lock or the ammeter; said switch means including connections to each of the lamp means, to the shunt terminal, and to the relay terminal and, in the position connecting said flasher to the ammeter, connecting one set of lamp means to the shunt terminal and the other set of lamp means to the relay terminal.

References Cited in the file of this patent

UNITED STATES PATENTS

| Number | Name | Date |
|---|---|---|
| 1,704,709 | Murray | Mar. 12, 1929 |
| 2,090,332 | O'Neil | Aug. 17, 1937 |
| 2,122,508 | Bell | July 5, 1938 |
| 2,258,747 | Doane | Oct. 14, 1941 |
| 2,300,896 | Hosmer | Nov. 3, 1942 |
| 2,358,332 | Kennett | Sept. 12, 1944 |
| 2,652,553 | Hollins | Sept. 15, 1953 |
| 2,667,602 | Flemming | Jan. 26, 1954 |